United States Patent
Meng

(10) Patent No.: US 12,242,273 B2
(45) Date of Patent: Mar. 4, 2025

(54) METHOD AND APPARATUS FOR CONTROLLING SELF-MOVING DEVICE, AND DEVICE

(71) Applicant: Dreame Innovation Technology (Suzhou) Co., LTD., Suzhou (CN)

(72) Inventor: Jia Meng, Suzhou (CN)

(73) Assignee: Dreame Innovation Technology (Suzhou) Co., LTD., Suzhou (CN)

( * ) Notice: Subject to any disclaimer, the term of this patent is extended or adjusted under 35 U.S.C. 154(b) by 206 days.

(21) Appl. No.: 18/008,177

(22) PCT Filed: Feb. 26, 2021

(86) PCT No.: PCT/CN2021/077993
§ 371 (c)(1),
(2) Date: Dec. 4, 2022

(87) PCT Pub. No.: WO2021/244075
PCT Pub. Date: Dec. 9, 2021

(65) Prior Publication Data
US 2023/0288937 A1 Sep. 14, 2023

(30) Foreign Application Priority Data
Jun. 4, 2020 (CN) .......................... 202010498121.9

(51) Int. Cl.
*G05D 1/02* (2020.01)
*B60L 53/14* (2019.01)
*G05D 1/00* (2006.01)

(52) U.S. Cl.
CPC ............ *G05D 1/0217* (2013.01); *B60L 53/14* (2019.02)

(58) Field of Classification Search
CPC .... G05D 1/0217; G05D 1/0219; B60L 53/14; B60L 2240/62; B60L 2240/80; B60L 2260/32; B60L 2260/54; B60L 58/12; B60L 53/35; G06Q 10/04; G06Q 10/0631; Y02T 10/70; Y02T 90/10
See application file for complete search history.

(56) References Cited

U.S. PATENT DOCUMENTS

| 5,444,965 A | 8/1995 | Colens |
| 6,728,607 B1 * | 4/2004 | Anderson ............ G05D 1/0274 701/25 |

(Continued)

FOREIGN PATENT DOCUMENTS

| CN | 108143353 A | 6/2018 |
| CN | 108606740 A | 10/2018 |

(Continued)

*Primary Examiner* — Adam R Mott
*Assistant Examiner* — Sagar Kc

(57) ABSTRACT

A control method for a self-moving device includes: obtaining a first working time corresponding to an unworked area in a target working area when a current remaining power of the self-moving device meets a preset charging condition, the target working area being an area where the self-moving device works; determining a first power consumption required by the unworked area according to the first working time; and charging the self-moving device according to the first power consumption. A control apparatus for implementing the control method for the self-moving device is also disclosed.

10 Claims, 3 Drawing Sheets step 301, in a case that the current remaining power of the self-moving device meets the preset charging condition, obtaining a first working time corresponding to the unworked area in the target working area;

↓ step 302: determining the first power consumption required by the unworked area according to the first working time;

↓ step 303, charging the self-moving device according to the first power consumption.

(56) References Cited

U.S. PATENT DOCUMENTS

| | | | |
|---|---|---|---|
| 2007/0267998 A1 | 11/2007 | Cohen et al. | |
| 2012/0253568 A1 | 10/2012 | Uyeki | |
| 2013/0116868 A1* | 5/2013 | Erko | B60L 53/64 |
| | | | 320/109 |
| 2013/0214726 A1* | 8/2013 | Teng | G01J 5/028 |
| | | | 250/349 |
| 2016/0165795 A1* | 6/2016 | Balutis | G05D 1/0044 |
| | | | 701/25 |
| 2016/0355338 A1* | 12/2016 | Kazama | B65G 1/0492 |
| 2017/0079195 A1* | 3/2017 | Yokoyama | B60W 10/18 |
| 2017/0244270 A1* | 8/2017 | Waters | H02J 50/80 |
| 2018/0136664 A1* | 5/2018 | Tomita | A01B 69/008 |
| 2018/0184868 A1* | 7/2018 | Han | A47L 9/2842 |
| 2018/0215393 A1* | 8/2018 | Miyakubo | G07C 5/0825 |
| 2020/0019178 A1* | 1/2020 | Orzechowski | A47L 11/4011 |
| 2021/0373558 A1* | 12/2021 | Schneider | G05D 1/0016 |
| 2022/0071467 A1* | 3/2022 | Zhang | A47L 11/284 |
| 2022/0338700 A1* | 10/2022 | Xiao | A47L 9/2873 |

FOREIGN PATENT DOCUMENTS

| | | | |
|---|---|---|---|
| CN | 109077659 A | 12/2018 | |
| CN | 109085828 A | 12/2018 | |
| CN | 109142971 A | 1/2019 | |
| CN | 109392308 A | 2/2019 | |
| CN | 109431383 A | 3/2019 | |
| CN | 110603549 A | 12/2019 | |
| CN | 110782148 A | 2/2020 | |
| CN | 111650937 A | 9/2020 | |
| JP | 2019-107400 A | 7/2019 | |

\* cited by examiner

METHOD AND APPARATUS FOR CONTROLLING SELF-MOVING DEVICE, AND DEVICE

CROSS REFERENCE TO RELATED APPLICATIONS

This application is a 35 U.S.C. § 371 National Phase conversion of International (PCT) Patent Application No. PCT/CN2021/077993, filed on Feb. 26, 2021, which claims priority to Chinese Patent Application No. 202010498121.9, filed on Jun. 4, 2020, the disclosure of which is here incorporated by reference in its entirety. The PCT International Patent Application was filed and published in Chinese.

TECHNICAL FIELD

The present disclosure relates to a technical field of automation control, and in particular, to a control method, apparatus, and device for a self-moving device.

BACKGROUND

With the development of science and technology, the degree of intelligence of self-moving devices is getting higher and higher. A self-moving device can be a smart device capable of self-moving and capable of completing one or more tasks. The one or more tasks may be, for example, sweeping, mopping, mowing, delivering meals, or the like.

In the related art, during the working process of the self-moving device, in the case of insufficient power, the self-moving device will stop working or return to a charging station for charging, resulting in low working efficiency of the self-moving device.

SUMMARY

The present disclosure provides a control method, an apparatus, and a device for a self-moving device, which can intelligently charge the self-moving device and improve the working efficiency of the self-moving device.

In a first aspect, an embodiment of the present disclosure provides a control method for a self-moving device, and the method includes:
  obtaining a first working time corresponding to an unworked area in a target working area when a current remaining power of the self-moving device meets a preset charging condition, the target working area being an area where the self-moving device works;
  determining a first power consumption required by the unworked area according to the first working time; and
  charging the self-moving device according to the first power consumption.

In a possible embodiment, obtaining the first working time corresponding to the unworked area in the target working area when the current remaining power of the self-moving device meets the preset charging condition, includes:
  obtaining a total working time corresponding to the target working area;
  obtaining an already worked time of the self-moving device in the target working area when the current remaining power of the self-moving device meets the preset charging condition; and
  calculating to get the first working time according to the total working time and the already worked time.

In a possible embodiment, obtaining the total working time corresponding to the target working area, includes:
  obtaining a historical working time data corresponding to the target working area; and
  getting the total working time according to the historical working time data.

In a possible embodiment, the historical working time data corresponding to the target working area is a working time taken by the self-moving device to complete the work of the entire target working area each time in a historical time period, and getting the total working time according to the historical working time data includes:
  calculating an average working time required to complete the work of the entire target working area at a single time according to the working time it takes to complete the work of the entire target working area each time in the historical time period; and
  taking the average working time as the total working time.

In a possible embodiment, calculating to get the first working time according to the total working time and the already worked time, includes:
  calculating to get the first working time according to a difference between the total working time and the already worked time.

In a possible embodiment, obtaining the first working time corresponding to the unworked area in the target working area when the current remaining power of the self-moving device meets the preset charging condition, includes:
  obtaining a current position of the self-moving device when the current remaining power of the self-moving device meets the preset charging condition; and
  obtaining the first working time according to the current position of the self-moving device and a relationship between each working position in the target working area and a remaining working time.

In a possible embodiment, the method further includes a step of determining the relationship between each working position in the target working area and the remaining working time. The step includes:
  obtaining a working process of the self-moving device completing the work of the entire target working area at least once in the historical time period; wherein the working process includes each working position of the self-moving device and a time point corresponding to each working position obtained at preset time intervals; and
  determining the relationship between each working position in the target working area and the remaining working time according to the time point corresponding to each working position of the self-moving device in each working process.

In a possible embodiment, determining the first power consumption required by the unworked area according to the first working time, includes:
  obtaining a power consumption corresponding to a unit time; and
  calculating to get the first power consumption according to the power consumption corresponding to the unit time and the first working time.

In a possible embodiment, before charging the self-moving device according to the first power consumption, the method further includes:
  controlling the self-moving device to move to a charging station, so that the charging station is mated with the self-moving device.

In a possible embodiment, after charging the self-moving device according to the first power consumption, the method further includes:

controlling the self-moving device to move to the unworked area to continue working.

In a second aspect, an embodiment of the present disclosure provides a control apparatus for a self-moving device, and the apparatus includes:

a time obtaining module, configured to obtain a first working time corresponding to an unworked area in a target working area when a current remaining power of the self-moving device meets a preset charging condition, the target working area being an area where the self-moving device works;

a power determining module, configured to determine a first power consumption required by the unworked area according to the first working time; and a control module, configured to charge the self-moving device according to the first power consumption.

In a third aspect, an embodiment of the present disclosure provides a control apparatus for a self-moving device. The apparatus includes a processor and a memory. At least one instruction is stored in the memory. The at least one instruction is loaded and executed by the processor to implement the control method for the self-moving device according to the first aspect.

In a fourth aspect, an embodiment of the present disclosure provides a self-moving device, including a processor and a memory. At least one instruction is stored in the memory. The at least one instruction is loaded and executed by the processor to implement the control method for the self-moving device according to the first aspect.

In a fifth aspect, an embodiment of the present disclosure provides a computer-readable storage medium, including at least one instruction stored in the computer-readable storage medium. The at least one instruction is loaded and executed by a processor to implement the control method for the self-moving device according to the first aspect.

In the embodiment of the present disclosure, by obtaining the first working time corresponding to the unworked area in the target working area when the current remaining power of the self-moving device meets the preset charging condition, the target working area being an area where the self-moving device works; determining the first power consumption required by the unworked area according to the first working time; and charging the self-moving device according to the first power consumption, the self-moving device in this embodiment of the present disclosure is charged according to the first power consumption required by the unworked area. When the power of the self-moving device reaches the first power consumption required by the unworked area, the self-moving device can automatically return to the unworked area to continue working, thereby effectively improving the working efficiency of the self-moving device.

DETAILED DESCRIPTION

The specific implementations of the present disclosure will be described in further detail below with reference to the accompanying drawings and embodiments. The following examples are used to illustrate the present disclosure, but are not intended to limit the scope of the present disclosure.

Figure 1:
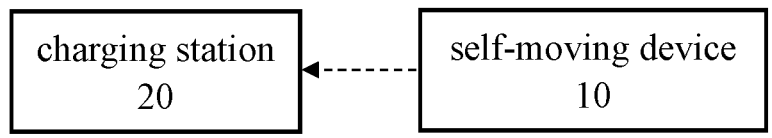
FIG. 1 is a schematic diagram of an application scenario of a control method for a self-moving device provided by an embodiment of the present disclosure.

FIG. 1 is a schematic diagram of an application scenario of a charging control method for a self-moving device provided by an embodiment of the present disclosure. When a current remaining power of the self-moving device 10 meets a preset charging condition, the self-moving device 10 can be controlled to move to a charging station 20, and the charging station 20 charges the self-moving device 10.

The self-moving device 10 may be a smart device capable of self-moving and capable of completing one or more tasks. The one or more tasks may be cleaning tasks such as sweeping, mopping, and window cleaning, or may be delivery tasks such as meal delivery and item delivery, or outdoor tasks such as mowing. Embodiments of the present disclosure does not limit the work performed by the self-moving device.

The charging station 20 may be a device that provides charging services for the self-moving device. In the embodiment of the present disclosure, the charging station 20 can charge the self-moving device 10 through a wired charging method or a wireless charging method.

FIG. 1 is a schematic structural diagram of a self-moving device provided by an embodiment of the present disclosure. As shown in FIG. 1, the self-moving device 10 at least includes: a control apparatus 110 and a power supply apparatus 120 connected to the control apparatus 110.

The power supply apparatus 120 is used to supply power to the self-moving device 10. The power supply apparatus 120 may be a battery or other device having a power supply function, and the embodiment of the power supply apparatus 120 is not limited in the embodiments of the present disclosure.

The control apparatus 110 is used to control the self-moving device 10, such as: controlling the start and stop of the self-moving device 10, the movement direction, the movement speed, the operation of each module in the self-moving device 10, and the like.

Alternatively, the embodiment of the present disclosure is described by taking the control apparatus 110 being set in the self-moving device 10 as an example for description. In other embodiments, the control apparatus 110 may not be provided in the self-moving device 10. For example, the control apparatus 110 may be provided at a remote control apparatus, or the charging station, etc., independent of the self-moving device. This embodiment of the present disclosure does not limit the embodiment of the control apparatus 110.

The control apparatus 110 of the self-moving device 10 is configured to obtain the first working time corresponding to the unworked area in the target working area when the current remaining power of the power supply apparatus 120 meets the preset charging condition; determine the first power consumption required by the unworked area according to the first working time; and charge the self-moving device 10 according to the first power consumption.

The preset charging condition may be that the power is less than or equal to a preset power threshold and the work of the target working area has not been completed. The embodiment of the present disclosure does not limit the preset charging condition.

The target working area is a working area of the self-moving device 10. The target working area can be an independent area; alternatively, it can be a working area composed of multiple independent sub-areas. The embodiment of the present disclosure does not limit the type of the working area. The target working area may be a preset working area, a working area determined by the self-moving device 10 in a historical working process, or a working area selected by a user, or the like. The embodiment of the present disclosure does not limit the manner of determining the target working area.

The unworked area refers to an area within the target working area that has not been worked by the self-moving device 10. Taking the cleaning work performed by the self-moving device 10 as an example, the unworked area refers to an area that has not been cleaned by the self-moving device 10 within the target working area.

The first working time refers to a working time required to complete the work from the self-moving device 10 in the unworked area.

The first power consumption refers to a power consumption required by the self-moving device 10 to complete the work in the unworked area.

In the related art, when the self-moving device 10 is in a low power state, the self-moving device 10 is usually controlled to move to the charging station for charging. In one case, during the charging process of the self-moving device 10, the self-moving device 10 receives a work instruction, and then executes the work corresponding to the work instruction. For example, when the user judges that the power of the self-moving device 10 is sufficient to complete the work in the unworked area, an instruction is sent to control the self-moving device 10 to return to the unworked area to continue working. However, in this case, the self-moving device 10 cannot automatically complete the work in the unworked area during the charging process or after the charging is completed. This requires manual control of the self-moving device 10. In another case, after the self-moving device 10 is charged to a fixed power level (e.g., 70% or 100% of the total power), the self-moving device 10 returns to the unworked area to continue working. However, it takes a long time for the self-moving device 10 to reach the fixed power level, resulting that the self-moving device 10 cannot continue the previous work after a long period of time, and the work efficiency is low.

In an embodiment of the present disclosure, by obtaining the first working time required by the self-moving device to complete the work in the unworked area, the first power consumption required by the self-moving device to complete the work in the unworked area can be accurately determined, and the self-moving device can be charged according to the first power consumption. Therefore, when the power of the self-moving device reaches the first power consumption required by the unworked area, the self-moving device can automatically return to the unworked area to continue working, which can effectively improve the working efficiency of the self-moving device.

Figure 2:
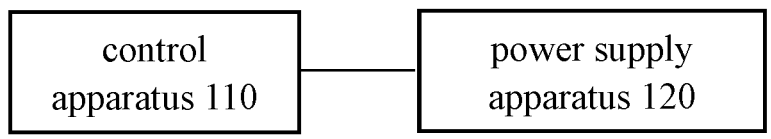
FIG. 2 is a schematic structural diagram of a self-moving device provided by an embodiment of the present disclosure.
Figure 3:
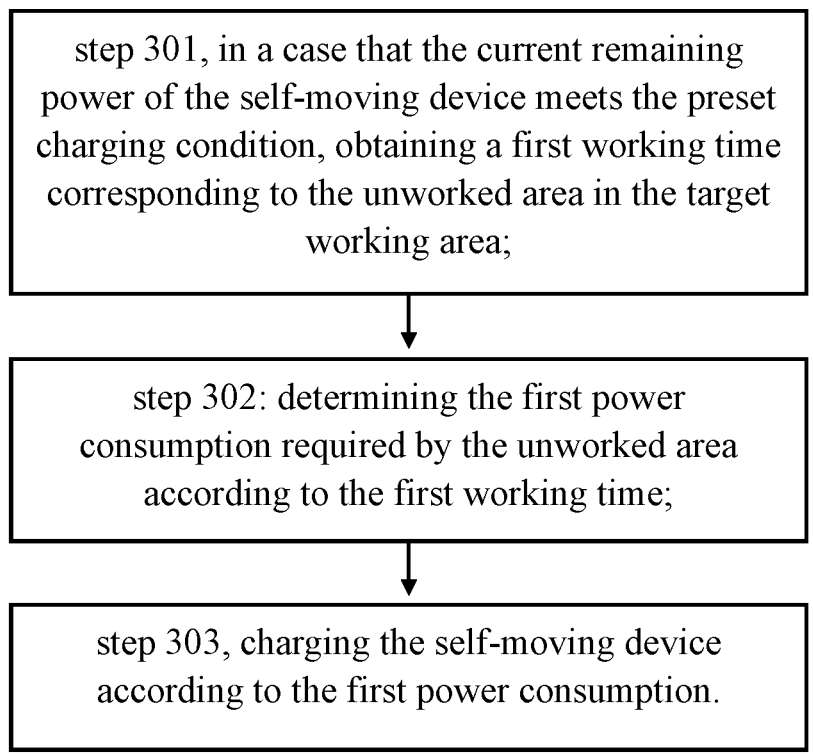
FIG. 3 is a flowchart of a control method for a self-moving device provided by an embodiment of the present disclosure.

FIG. 3 is a flowchart of a control method for a self-moving device provided by an embodiment of the present disclosure. The embodiments of the present disclosure are described by taking the method applied to the self-moving device 10 shown in FIG. 1 or FIG. 2 as an example. The method may be performed by the self-moving device 10. The method includes at least the following steps:

step 301, in a case that the current remaining power of the self-moving device meets the preset charging condition, obtaining a first working time corresponding to the unworked area in the target working area.

The self-moving device can be a smart device capable of self-moving and capable of completing one or more tasks. The one or more tasks may be cleaning tasks such as sweeping, mopping, and window cleaning, or delivery tasks such as delivering meals and items, or outdoor tasks such as mowing lawns. This embodiment of the present disclosure does not limit the work performed by the self-moving device.

The preset charging condition may be that the power is less than or equal to a preset power threshold and the work of the target working area has not been completed, or the current remaining power may be less than or equal to the first power consumption required by the unworked area, or the like. The embodiment of the present disclosure does not limit the preset charging conditions.

The target working area is an area where the self-moving device works. The target working area can be an independent area; alternatively, it can be a working area composed of multiple independent sub-areas. The embodiment of the present disclosure does not limit the type of the working area. The target working area may be a preset working area, or a working area determined by the self-moving device in a historical working process, or a working area selected by a user, or the like. The embodiments of the present disclosure do not limit the manner of determining the target working area.

Take the self-moving device as a cleaning robot and the cleaning robot is used to clean an indoor floor as an example, the target working area is the indoor area to be cleaned by the cleaning robot, such as a whole house area, or a working area selected by a user, or a working area determined by the cleaning robot after many cleanings, etc.

The unworked area refers to an area where the self-moving device has not yet been working within the target working area. Taking the cleaning work performed by the self-moving device as an example, the unworked area refers to an area in the target working area which has not yet been cleaned by the self-moving device.

The first working time refers to a working time required for the self-moving device to complete the work in the unworked area.

The preset charging condition may be stored in the self-moving device. For example, the preset charging condition may be that the power level is less than or equal to a preset power level threshold and the work in the target working area has not been completed. The preset power threshold may be 5% or 10% of the total power, and the embodiment of the present disclosure does not limit the value of the preset power threshold.

In a possible embodiment, in the case that the current remaining power of the self-moving device meets the preset charging conditions, the methods for obtaining the first working time corresponding to the unworked area in the target working area include but are not limited to the following:

A first method to obtain the first working time: obtaining a total working time corresponding to the target working area; in the case that the current remaining power of the self-moving device meets the preset charging condition, obtaining an already worked time of the self-moving device in the target working area; and calculating to get the first working time according to the total working time and the already worked time.

The total working time refers to a total working time required by the self-moving device to complete the work in the target working area.

The already worked time refers to a working time from when the self-moving device starts working in the target working area until the current remaining power meets the preset charging condition.

In a possible embodiment, obtaining the total working time corresponding to the target working area may include: obtaining historical working time data corresponding to the target working area; and obtaining the total working time according to the historical working time data.

The historical working time data corresponding to the target working area refers to the working time spent by the self-moving device each time completing work of the entire target working area in a historical time period. The working time only includes the time when the self-moving device performs work in the target working area, and does not include the time when the self-moving device is charged or paused during non-working situations. The historical time period may be a preset time period before the current time, for example, a time period such as one month before the current time, three months before the current time, and the like. The historical working time data can be stored in the self-moving device or sent to a server for storage.

Taking the self-moving device as a cleaning robot and the cleaning robot used to clean an indoor floor as an example, the historical working time data corresponding to the target working area refers to the working time spent by the cleaning robot to clean the entire target working area each time during the historical time period.

In this embodiment of the present disclosure, the first working time required for the self-moving device to complete the work in the unworked area can be accurately obtained by the total working time required for the self-moving device to complete the work in the target working area and the already worked time of the self-moving device in the target working area.

In a possible embodiment, getting the total working time according to the historical working time data, includes: calculating the average working time required to complete the work of the entire target working area in a single time according to the working time it takes to complete the work of the entire target working area each time in the historical time period; and taking this average working time as the total working time.

The amount of working time taken by the self-moving device to complete the work of the entire target working area each time is usually similar, but varies. The average working time required for the self-moving device to complete the work of the entire target working area at one time can be calculated by using the working time that the self-moving device takes to complete the work of the entire target working area each time in the historical time period. Through the average working time, the total working time of the self-moving device to complete the work in the target working area this time can be accurately obtained.

The manner of obtaining the total working time corresponding to the target working area is not limited to the above method, and the embodiment of the present disclosure does not limit the method of obtaining the total working time corresponding to the target working area.

In a possible embodiment, calculating to get the first working time according to the total working time and the already worked time, includes: calculating to get the first working time according to the difference between the total working time and the already worked time.

Take the self-moving device as a cleaning robot, and the cleaning robot is used to clean an indoor floor as an example. According to the difference between the total working time of the cleaning robot to clean the target working area and the already worked time, the first working time required for the cleaning robot to clean the unworked area can be calculated.

A second method to obtain the first working time: in the case that the current remaining power of the self-moving device meets the preset charging condition, obtaining the current position of the self-moving device; and obtaining the first working time according to the current position of the self-moving device, the relationship between each working position in the target working area and the remaining working time.

In a possible embodiment, the method of determining the relationship between each working position in the target working area and the remaining working time, includes: obtaining a working process in which the self-moving device completes the work of the entire target working area at least once in the historical time period; wherein the working process includes each working position of the self-moving device and a time point corresponding to each working position obtained at preset time intervals; and determining the relationship between each working position in the target working area and the remaining working time according to each working position of the self-moving device and the time point corresponding to each working position in each working process.

In the embodiment of the present disclosure, according to the relationship between each working position in the target working area and the remaining working time, the remaining working time corresponding to the current position when the current remaining power of the self-moving device meets the preset charging condition can be determined. Thus, the first working time required for the self-moving device to complete the work in the unworked area can be determined.

step 302: determining the first power consumption required by the unworked area according to the first working time.

The first power consumption refers to the power consumption required by the self-moving device to complete the work in the unworked area.

Determining the first power consumption in the unworked area according to the first working time, includes: obtaining the power consumption corresponding to a unit time; and calculating to get the first power consumption according to the power consumption corresponding to the unit time and the first working time.

The power consumption corresponding to the unit time refers to a power consumption that the self-moving device needs to work in the unit time. The power consumption corresponding to the unit time can be obtained through experiments, and the embodiment of the present disclosure does not limit the manner of obtaining the power consumption corresponding to the unit time.

In a possible embodiment, calculating to get the first power consumption according to the power consumption corresponding to the unit time and the first working time, includes:
  calculating to get the first power consumption according to the product of the power consumption corresponding to the unit time and the first working time.

step 303, charging the self-moving device according to the first power consumption.

Charging the self-moving device according to the first power consumption refers to charging the self-moving device so that the power of the self-moving device reaches the first power consumption.

After the self-moving device reaches the first power consumption, the self-moving device can continue to perform the unfinished work, for example, return to the unworked area to continue working, or send out prompt information (such as sound, indicator light), etc., which is not limited in the embodiments of the present disclosure.

In a possible embodiment, before charging the self-moving device according to the first power consumption, the method further includes:

controlling the self-moving device to move to the charging station, so that the charging station is mated with the self-moving device.

The charging station refers to a device that provides charging services for power supply modules. In the embodiment of the present disclosure, the charging station may charge the self-moving device in a wired charging method or a wireless charging method.

The embodiment of the present disclosure controls the self-moving device to move to the charging station for charging when the current remaining power of the self-moving device meets the preset charging condition, that is, the self-moving device can be automatically recharged.

In a possible embodiment, after charging the self-moving device according to the first power consumption, the method further includes: controlling the self-moving device to move to an unworked area to continue working.

Taking the working position of the self-moving device when the current remaining power meets the preset charging condition as a first position, controlling the self-moving device to move to the unworked area to continue working means controlling the self-moving device to move to the first position to continue working. Because when the self-moving device reaches the first power consumption required by the unworked area, it moves to the unworked area and continues to work. Therefore, the self-moving device can efficiently and intelligently complete the work in the unworked area. For example, in the case where the first working time corresponding to the unworked area is short, the self-moving device only needs to take a short time to be charged to reach the first power consumption, and then it can continue to work in the unworked area without waiting for a long time to charge, and the work efficiency is high. In the case that the first working time corresponding to the unworked area is relatively long, the self-moving device will continue to work in the unworked area when the charging reaches the first power consumption, so as to avoid the situation that the power is insufficient to complete the work in the unworked area.

In the embodiment of the present disclosure, by obtaining the first working time required by the self-moving device to complete the work in the unworked area, the first power consumption required by the self-moving device to complete the work in the unworked area can be accurately determined, and the self-moving device is charged according to the first power consumption, so that when the power of the self-moving device reaches the first power consumption required by the unworked area, the self-moving device can automatically return to the unworked area to continue working, which can effectively improve the work efficiency of the self-moving device.

In order to introduce the above-mentioned control method of the self-moving device more clearly, the following two examples are used for description.

A first example: the historical working time data corresponding to the self-moving device in the target working area is obtained. The historical working time data is the working time spent each time completing the work of the entire target working area in the past month. The working time only includes the time when the self-moving device performs work in the target working area, and does not include the time when the self-moving device is charged or paused during non-working situations. The average working time required to complete the work of the entire target working area at a time according to the working time spent to complete the work of the entire target working area each time in the past month is calculated to obtain the total working time for the self-moving device to complete the work in the target working area is 120 minutes. When the current remaining power of the self-moving device reaches the preset power threshold of 5%, the already worked time of the self-moving device in the target working area is obtained as 90 minutes, and the first working time is calculated as 120−90=30 minutes. The power consumption required by the self-moving device to perform work per unit time is obtained, which is 0.83% of the total power. The first power consumption is calculated as 0.83%×30=25%, which is 25% of the total power. The self-moving device moves to the charging station for charging. When the self-moving device is charged to 25% of the total capacity, it continues to complete the work in the unworked area.

A second example: when the current remaining power of the self-moving device reaches 5% of the preset power threshold, the current position of the self-moving device is obtained. According to the current position of the self-moving device and the relationship between each working position in the target working area and the remaining working time, the first working time required for the self-moving device to complete the work in the unworked area is 90 minutes. The power consumption required by the self-moving device to perform work per unit time is obtained, which is 0.83% of the total power. The first power consumption is calculated as 0.83%×30=25%, which is 25% of the total power. The self-moving device moves to the charging station for charging. When the self-moving device is charged to 25% of the total capacity, it continues to complete the work in the unworked area.

In the control method of the self-moving device provided by the embodiment of the present disclosure, by obtaining the first working time corresponding to the unworked area in the target working area when the current remaining power of the self-moving device meets the preset charging condition, the target working area being an area where the self-moving device works; determining the first power consumption required by the unworked area according to the first working time; and charging the self-moving device according to the first power consumption, the self-moving device in this embodiment of the present disclosure is charged according to the first power consumption required by the unworked area. When the power of the self-moving device reaches the first power consumption required by the unworked area, the self-moving device can automatically return to the unworked area to continue working, thereby effectively improving the working efficiency of the self-moving device.

It can be understood that the above-mentioned method embodiments mentioned in the present disclosure can be combined with each other to form a combined embodiment without violating the principle and logic. For the brevity of the description, details are not repeated in this disclosure.

Figure 4:
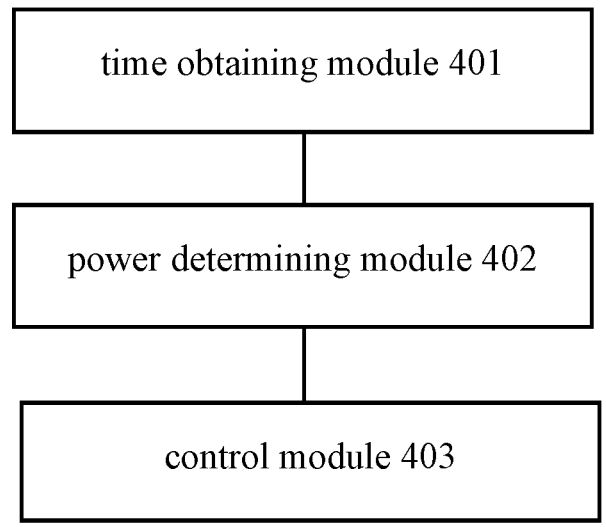
FIG. 4 is a schematic structural diagram of a control apparatus for a self-moving device provided by an embodiment of the present disclosure.

FIG. 4 is a block diagram of a control apparatus of a self-moving device provided by an embodiment of the present disclosure. The embodiments of the present disclosure are described by taking the apparatus applied to the control apparatus of the self-moving device shown in FIG. 1 as an example. The apparatus includes at least the following modules: a time obtaining module 401, a power determining module 402, and a charging control module 403.

The time obtaining module 401 is configured to obtain a first working time corresponding to an unworked area in a target working area when a current remaining power of the self-moving device meets a preset charging condition. The target working area is an area where the self-moving device works.

The power determining module 402 is configured to determine a first power consumption required by the unworked area according to the first working time.

The control module 403 is configured to charge the self-moving device according to the first power consumption.

In a possible embodiment, the time obtaining module 401 is configured for:
obtaining the total working time corresponding to the target working area;
obtaining the already worked time of the self-moving device in the target working area, in the case that the current remaining power of the self-moving device meets the preset charging condition; and
calculating to get the first working time according to the total working time and the already worked time.

In a possible embodiment, the time obtaining module 401 is configured for:
obtaining historical working time data corresponding to the target working area; and
obtaining the total working time according to the historical working time data.

In a possible embodiment, the time obtaining module 401 is configured for:
obtaining the current position of the self-moving device, in the case that the current remaining power of the self-moving device meets the preset charging condition; and
obtaining the first working time according to the current position of the self-moving device, the relationship between each working position in the target working area and the remaining working time.

In a possible embodiment, the power determining module 402 is configured for:
obtaining the power consumption corresponding to a unit time; and
calculating to get the first power consumption according to the power consumption corresponding to the unit time and the first working time.

In a possible embodiment, the control module 403 is further configured for:
controlling the self-moving device to move to the charging station, so that the charging station is mated with the self-moving device.

In a possible embodiment, the control module 403 is further configured for:
controlling the self-moving device to move to an unworked area to continue working.

According to the control apparatus of the self-moving device provided by the embodiment of the present disclosure, by obtaining the first working time corresponding to the unworked area in the target working area when the current remaining power of the self-moving device meets the preset charging condition, the target working area being an area where the self-moving device works; determining the first power consumption required by the unworked area according to the first working time; and charging the self-moving device according to the first power consumption, the self-moving device in this embodiment of the present disclosure is charged according to the first power consumption required by the unworked area. When the power of the self-moving device reaches the first power consumption required by the unworked area, the self-moving device can automatically return to the unworked area to continue working, thereby effectively improving the working efficiency of the self-moving device.

It should be noted that: the control apparatus of the self-moving device provided in the above-mentioned embodiments is only described by taking the division of the above-mentioned functional modules as an example. In practical applications, the above-mentioned functions can be assigned to different function modules as required. That is, the internal structure of the control apparatus of the self-moving device is divided into different functional modules to complete all or part of the functions described above. In addition, the control apparatus for a self-moving device provided in the above embodiment and the control method for the self-moving device belong to the same concept, and the specific implementation process thereof is detailed in the method embodiment, which will not be repeated here.

Figure 5:
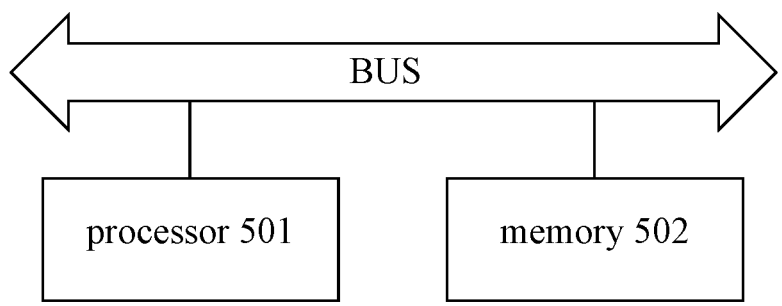
FIG. 5 is a schematic structural diagram of a control apparatus for a self-moving device provided by an embodiment of the present disclosure.

FIG. 5 is a schematic structural diagram of a control apparatus for a self-moving device provided by an embodiment of the present disclosure. The apparatus includes at least a processor 501 and a memory 502.

The processor 501 may include one or more processing cores, such as a 4-core processor, a 6-core processor, and the like. The processor 501 may be implemented in at least one hardware form among DSP (Digital Signal Processing), FPGA (Field-Programmable Gate Array), and PLA (Programmable Logic Array). The processor 501 may also include a main processor and a co-processor. The main processor is a processor for processing data in a wake-up state, and is also called a CPU (Central Processing Unit). The co-processor is a low-power processor for processing data in a standby state.

The memory 502 may include one or more computer-readable storage medium. The computer-readable storage medium may be non-transitory. The memory 502 may also include high-speed random access memory, as well as non-volatile memory, such as one or more disk storage devices, flash storage devices. In some embodiments, a non-transitory computer-readable storage medium in the memory 502 is used to store at least one instruction. The at least one instruction is loaded and executed by the processor 501 to implement the control method of the self-moving device provided by the above embodiments.

In some embodiments, the control apparatus of the self-moving device may further include: a peripheral device port and at least one peripheral device. The processor 501, the memory 502 and the peripheral device port can be connected through a BUS or a signal line. Each peripheral device can be connected to the peripheral device port through the BUS, the signal line or a circuit board. Illustratively, the peripheral devices include, but are not limited to, radio frequency circuits, positioning components, audio circuits, and power supplies etc.

It is understandable to those skilled in the art that the structure shown in FIG. 5 does not constitute a limitation on the control apparatus of the self-moving device. The control apparatus of the self-moving device may further include fewer or more modules, or combine certain components, or adopt different assembly arrangements, which are not limited in this embodiment of the present disclosure.

Figure 6:
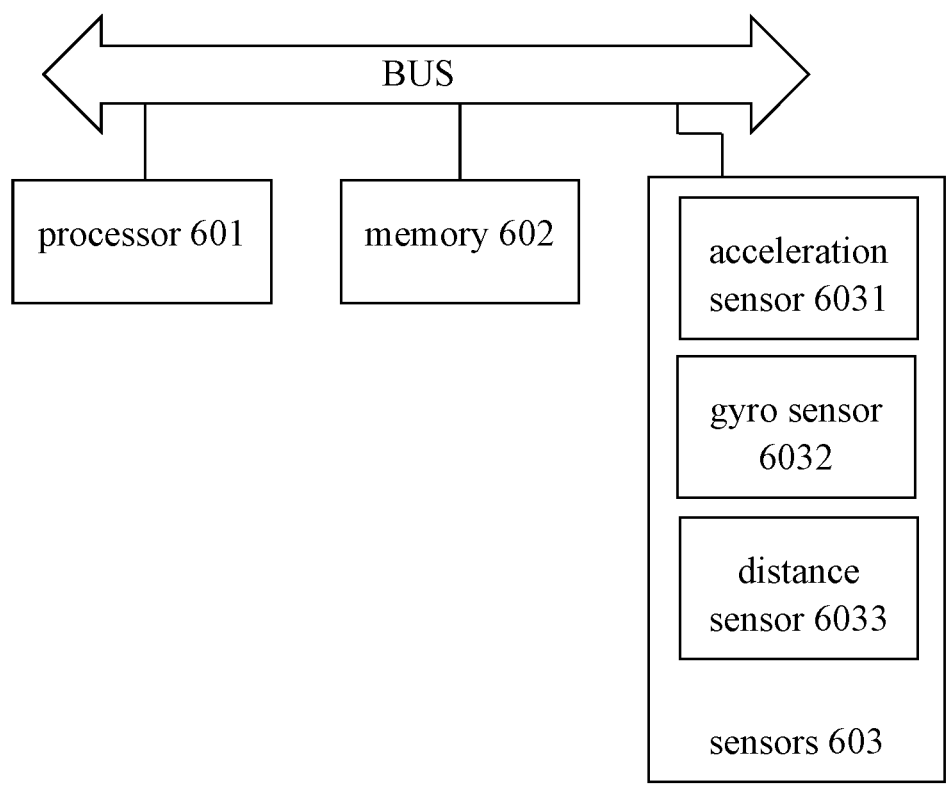
FIG. 6 is a schematic structural diagram of a self-moving device provided by an embodiment of the present disclosure.

FIG. 6 is a schematic structural diagram of a self-moving device provided by an embodiment of the present disclosure. The self-moving device includes at least a processor 601 and a memory 602.

The processor 601 may include one or more processing cores, such as a 4-core processor, a 6-core processor, and the like. The processor 601 may be implemented in at least one hardware form among DSP (Digital Signal Processing), FPGA (Field-Programmable Gate Array), and PLA (Programmable Logic Array). The processor 601 may also include a main processor and a co-processor. The main processor is a processor for processing data in a wake-up state, and is also called a CPU (Central Processing Unit). The co-processor is a low-power processor for processing data in a standby state.

The memory 602 may include one or more computer-readable storage medium. The computer-readable storage medium may be non-transitory. The memory 602 may also include high-speed random access memory, as well as non-volatile memory, such as one or more disk storage devices, flash storage devices. In some embodiments, a non-transitory computer-readable storage medium in the memory 602 is used to store at least one instruction. The at least one instruction is loaded and executed by the processor 601 to implement the control method of the self-moving device provided by the above embodiments.

In some embodiments, the self-moving device may further include: a peripheral device port and at least one peripheral device. The processor 601, the memory 602 and the peripheral device port can be connected through a BUS or a signal line. Each peripheral device can be connected to the peripheral device port through the BUS, the signal line or a circuit board. Illustratively, the peripheral devices include, but are not limited to, radio frequency circuits, positioning components, audio circuits, and power supplies etc.

In some embodiments, the self-moving device may also include one or more sensors 603. The one or more sensors 603 include, but are not limited to, an acceleration sensor 6031, a gyro sensor 6032, and a distance sensor 6033.

The acceleration sensor 6031 can detect the magnitude of acceleration on the three coordinate axes of the coordinate system established by the control apparatus of the self-moving device. For example, the acceleration sensor 6031 can be used to detect the components of the gravitational acceleration on the three coordinate axes. The processor 601 can control the self-moving device according to the gravitational acceleration signal collected by the acceleration sensor 6031.

The gyro sensor 6032 can detect the body direction and rotation angle of the control apparatus of the self-moving device. The gyroscope sensor 6032 can cooperate with the acceleration sensor 6031 to collect the 3D motion of the control apparatus of the self-moving device. The processor 601 can implement the following functions according to the data collected by the gyroscope sensor 6032: motion sensing (for example, controlling the self-moving device according to the posture of the self-moving device), and inertial navigation.

The distance sensor 6033 is used to collect the distance between the self-moving device and the object. The processor 601 can determine whether there is an obstacle, whether there is a cliff and other information according to the data collected by the distance sensor 6033.

It is understandable to those skilled in the art that the structure shown in FIG. 6 does not constitute a limitation of the self-moving device. The self-moving device may further include fewer or more modules, or combine certain components, or employ different assembly arrangements, which are not limited in this embodiment of the present disclosure.

An embodiment of the present disclosure further provides a computer-readable storage medium. At least one instruction is stored in the computer-readable storage medium. The at least one instruction is loaded and executed by the processor to implement the control method of the self-moving device according to the above method embodiments.

The technical features of the above-described embodiments can be combined arbitrarily. For the sake of brevity, all possible combinations of the technical features in the above embodiments are not described. However, as long as there is no contradiction in the combination of these technical features, it should be regarded as the scope described in this specification.

The above-mentioned embodiments only represent several embodiments of the present disclosure, and the descriptions thereof are relatively specific and detailed, but should not be construed as a limitation on the scope of the present patent disclosure. It should be noted that, for those skilled in the art, several modifications and improvements can be made without departing from the concept of the present disclosure. These all belong to the protection scope of the present disclosure. Therefore, the scope of protection of the patent of the present disclosure shall be subject to the appended claims.

What is claimed is:

1. A control method for a self-moving device, the method comprising:

obtaining a first working time corresponding to an unworked area in a target working area when a current remaining power of the self-moving device meets a preset charging condition, the target working area being an area where the self-moving device works;

determining a first power consumption required by the unworked area according to the first working time; and charging the self-moving device according to the first power consumption, wherein the obtaining a first working time corresponding to an unworked area in a target working area when a current remaining power of the self-moving device meets a preset charging condition, comprises:

obtaining a current position of the self-moving device when the current remaining power of the self-moving device meets the preset charging condition; and obtaining the first working time according to the current position of the self-moving device and a relationship between each working position in the target working area and a remaining working time, wherein the relationship between each working position in the target working area and the remaining working time is determined according to:

obtain a working process of the self-moving device completing the work of the entire target working area at least once in a historical time period, wherein the working process comprises each working position of the self-moving device and a time point corresponding to each working position obtained at preset time intervals; and determine the relationship between each working position in the target working area and the remaining working time according to the time point corresponding to each working position of the self-moving device in each working process.

2. The method according to claim 1, wherein determining the first power consumption required by the unworked area according to the first working time, comprises:
obtaining a power consumption corresponding to a unit time; and
calculating to get the first power consumption according to the power consumption corresponding to the unit time and the first working time.

3. The method according to claim 2, wherein calculating to get the first power consumption according to the power consumption corresponding to the unit time and the first working time, comprises:
calculating to get the first power consumption according to the product of the power consumption corresponding to the unit time and the first working time.

4. The method according to claim 1, wherein before charging the self-moving device according to the first power consumption, the method further comprises:
controlling the self-moving device to move to a charging station, so that the charging station is mated with the self-moving device.

5. The method according to claim 1, wherein after charging the self-moving device according to the first power consumption, the method further comprises:
controlling the self-moving device to move to the unworked area to continue working.

6. A control apparatus for a self-moving device, the apparatus comprising a processor and a memory, at least one instruction being stored in the memory, the at least one instruction being loaded and executed by the processor to implement a control method for the self-moving device, the control method for the self-moving device comprising:
obtaining a first working time corresponding to an unworked area in a target working area when a current remaining power of the self-moving device meets a preset charging condition, the target working area being an area where the self-moving device works;
determining a first power consumption required by the unworked area according to the first working time; and
charging the self-moving device according to the first power consumption, wherein the obtaining a first working time corresponding to an unworked area in a target working area when a current remaining power of the self-moving device meets a preset charging condition, comprises:
obtaining a current position of the self-moving device when the current remaining power of the self-moving device meets the preset charging condition; and
obtaining the first working time according to the current position of the self-moving device and a relationship between each working position in the target working area and a remaining working time,
wherein the relationship between each working position in the target working area and the remaining working time is determined according to:
obtain a working process of the self-moving device completing the work of the entire target working area at least once in the historical time period, wherein the working process comprises each working position of the self-moving device and a time point corresponding to each working position obtained at preset time intervals; and
determine the relationship between each working position in the target working area and the remaining working time according to the time point corresponding to each working position of the self-moving device in each working process.

7. The control apparatus according to claim 6, wherein the control apparatus comprises the processor and the memory coupled to the processor, and the control apparatus comprises one or more modules executed by the processor, and the one or more modules comprise:
a time obtaining module, configured to obtain a first working time corresponding to an unworked area in a target working area when a current remaining power of the self-moving device meets a preset charging condition, the target working area being an area where the self-moving device works;
a power determining module, configured to determine a first power consumption required by the unworked area according to the first working time; and
a control module, configured to charge the self-moving device according to the first power consumption,
wherein to obtain the first working time corresponding to the unworked area in the target working area when the current remaining power of the self-moving device meets the preset charging condition, the obtaining module is configured to:
obtain a current position of the self-moving device when the current remaining power of the self-moving device meets the preset charging condition; and
obtain the first working time according to the current position of the self-moving device and a relationship between each working position in the target working area and a remaining working time,
wherein to obtain the relationship between each working position in the target working area and the remaining working time, the time obtaining module is configured to:
obtain a working process of the self-moving device completing the work of the entire target working area at least once in a historical time period, wherein the working process comprises each working position of the self-moving device and a time point corresponding to each working position obtained at preset time intervals; and
determine the relationship between each working position in the target working area and the remaining working time according to the time point corresponding to each working position of the self-moving device in each working process.

8. The control apparatus according to claim 7, wherein the power determining module is configured for obtaining the power consumption corresponding to a unit time; and
calculating to get the first power consumption according to the power consumption corresponding to the unit time and the first working time.

9. A self-moving device, comprising a processor and a memory, at least one instruction being stored in the memory, the at least one instruction being loaded and executed by the processor to implement a control method for the self-moving device, the control method for the self-moving device comprising:
obtaining a first working time corresponding to an unworked area in a target working area when a current remaining power of the self-moving device meets a preset charging condition, the target working area being an area where the self-moving device works;
determining a first power consumption required by the unworked area according to the first working time; and
charging the self-moving device according to the first power consumption, wherein the obtaining a first working time corresponding to an unworked area in a target working area when a current remaining power of the self-moving device meets a preset charging condition, comprises:
    obtaining a current position of the self-moving device when the current remaining power of the self-moving device meets the preset charging condition; and
    obtaining the first working time according to the current position of the self-moving device and a relationship between each working position in the target working area and a remaining working time,
wherein the relationship between each working position in the target working area and the remaining working time is determined according to:
    obtain a working process of the self-moving device completing the work of the entire target working area at least once in the historical time period; wherein the working process comprises each working position of the self-moving device and a time point corresponding to each working position obtained at preset time intervals; and
    determine the relationship between each working position in the target working area and the remaining working time according to the time point corresponding to each working position of the self-moving device in each working process.

10. The self-moving device according to claim 9, further comprising a computer-readable storage medium, at least one instruction being stored in the computer-readable storage medium, the at least one instruction being loaded and executed by a processor to implement a control method, the control method for the self-moving device comprising:
    obtaining a first working time corresponding to an unworked area in a target working area when a current remaining power of the self-moving device meets a preset charging condition, the target working area being an area where the self-moving device works;
    determining a first power consumption required by the unworked area according to the first working time; and
    charging the self-moving device according to the first power consumption,
wherein the obtaining a first working time corresponding to an unworked area in a target working area when a current remaining power of the self-moving device meets a preset charging condition, comprises:
    obtaining a current position of the self-moving device when the current remaining power of the self-moving device meets the preset charging condition; and
    obtaining the first working time according to the current position of the self-moving device and a relationship between each working position in the target working area and a remaining working time,
wherein the relationship between each working position in the target working area and the remaining working time is determined according to:
    obtain a working process of the self-moving device completing the work of the entire target working area at least once in the historical time period; wherein the working process comprises each working position of the self-moving device and a time point corresponding to each working position obtained at preset time intervals; and
    determine the relationship between each working position in the target working area and the remaining working time according to the time point corresponding to each working position of the self-moving device in each working process.

* * * * *